March 27, 1956 C. M. BARRINGER ET AL 2,739,989
PROCESS FOR REACTING CCl₄ WITH C₂F₂ IN A
FLUID BED, AND THE FLUID BED THEREFOR
Filed March 3, 1953 4 Sheets-Sheet 1

INVENTORS
CHARLES M. BARRINGER
BRUCE F. HARVEY
JOSEPH M. QUATTLEBAUM
JOHN D. STERLING, JR.
BY Edwin C. Woodhouse
ATTORNEY INVENTORS
CHARLES M. BARRINGER
BRUCE F. HARVEY
JOSEPH M. QUATTLEBAUM
JOHN D. STERLING, JR.
BY Edwin C. Woodhouse
ATTORNEY March 27, 1956    C. M. BARRINGER ET AL    2,739,989
PROCESS FOR REACTING $CCl_4$ WITH $C_aF_2$ IN A
FLUID BED, AND THE FLUID BED THEREFOR Filed March 3, 1953    4 Sheets-Sheet 3

INVENTORS
CHARLES M. BARRINGER
BRUCE F. HARVEY
JOSEPH M. QUATTLEBAUM
JOHN D. STERLING, JR.

BY *Edwin C. Woodhouse*

ATTORNEY

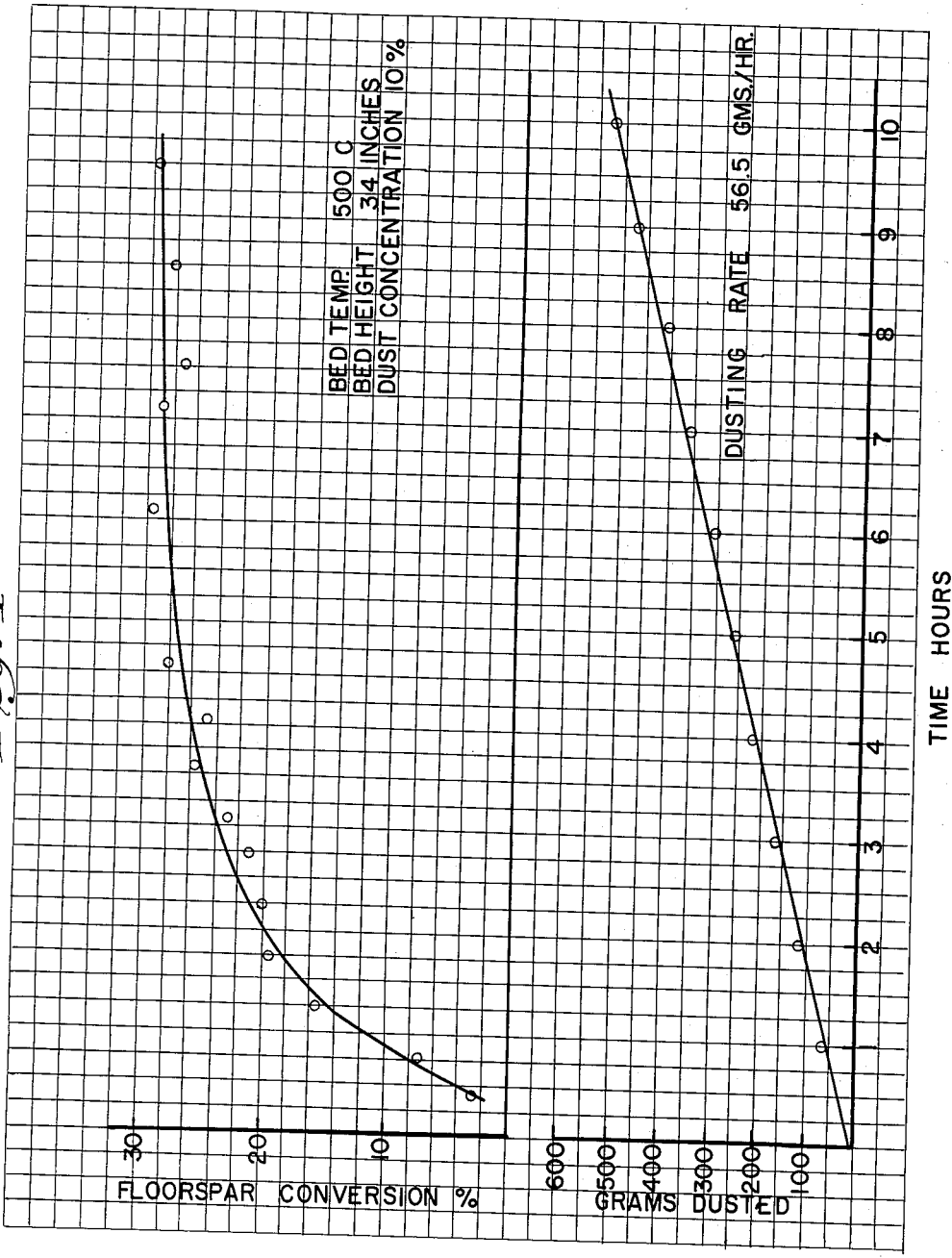

2,739,989
PROCESS FOR REACTING CCl₄ WITH CaF₂ IN A FLUID BED, AND THE FLUID BED THEREFOR

Charles M. Barringer, Chadds Ford, Pa., and Bruce F. Harvey, Woodstown, Joseph M. Quattlebaum, Bridgeport, and John D. Sterling, Jr., Glassboro, N. J., assignors to E. I. du Pont de Nemours & Company, Wilmington, Del., a corporation of Delaware Application March 3, 1953, Serial No. 340,008

15 Claims. (Cl. 260—653)

This invention relates to a process for reacting $CCl_4$ with $CaF_2$ in a fluid bed and to the fluid bed which is adapted for use in such process.

It is well known that carbon tetrachloride ($CCl_4$) will react with calcium fluoride ($CaF_2$) to produce mainly fluorotrichloromethane ($CCl_3F$) and some difluorodichloromethane ($CCl_2F_2$). However, it has not been known how to carry out such reaction in an economical manner so as to render the process practicable.

During the reaction, $CaF_2$ is converted to $CaCl_2$ which soon forms a layer on the surfaces of the $CaF_2$ particles. Such layer of $CaCl_2$ greatly slows down the rate of formation of the desired products and makes it necessary to replace the partially reacted calcium fluoride with fresh $CaF_2$. If the particles of $CaF_2$ are coarse they must be replaced before a reasonably large conversion has been obtained, whereby the process is rendered uneconomical and impractical. The rate of conversion and of formation of the desired products increases as the size of the particles of $CaF_2$ are decreased. However, if the $CaF_2$ particles are made sufficiently fine to obtain a rapid rate of conversion and of formation of the desired products, the particles agglomerate and form lumps, whereby the rate is slowed down so that the process becomes impractical. Fluid bed procedures require very finely-divided materials, and previous attempts to use a continuous fluid bed procedure in the reaction of $CCl_4$ with $CaF_2$ have failed because of the formation of the $CaCl_2$ layer on the particles of $CaF_2$ and the agglomeration of such finely-divided particles whereby the bed fails to function.

It is an object of the present invention to provide an improved process for reacting $CCl_4$ with $CaF_2$ in a fluid bed. Another object is to provide a process of such character employing a novel type of fluid bed which produces a high rate of conversion and which does not readily agglomerate so as to lose its fluid state. Still another object is to provide a continuous process for reacting $CCl_4$ with $CaF_2$ in which the $CaF_2$ is in a fluid bed which produces a high rate of conversion without readily agglomerating, and in which the fluid bed is maintained highly reactive and in a fluidized state over long periods of continuous operation. A further object is to provide novel compositions which are adapted for use as the fluid beds in the processes set forth in the preceding objects, which contain $CaF_2$ in a highly active form, which do not readily agglomerate and lose their fluidized state, and which can readily be maintained in active form and fluidized state over long periods of continuous operation. Further objects are to provide new compositions of matter and to advance the art. Still other objects will appear hereinafter.

The above and other objects may be accomplished in accordance with our invention which comprises passing gaseous $CCl_4$ at a superficial linear velocity of from 0.1 to 0.3 foot per second upward through a novel fluid bed (having a composition within the range hereinafter specified) which is maintained at a temperature of from about 450° C. to about 550° C., and recovering the gaseous reaction products. Preferably, the process is carried out continuously and, in such case, a portion of the solids will be removed from the top of the bed, intermittently or continuously, while simultaneously adding a substantially equal portion of fresh solids to the bottom of the bed as required to maintain the composition of the bed within the desired range. Desirably, the fresh solids, added to the bottom of the bed, will include solids removed from the top of the bed and which have been treated to eliminate the $CaCl_2$ therefrom, together with added solids.

The novel composition, which constitutes the fluid bed of our invention and which is to be used in our process, is an intimate mixture of solid particles, which mixture consists essentially of between 9% and 50% by weight of $CaF_2$ particles having a size such that they all pass through a 325 mesh screen but at least 55% of them are at least as large as 10 microns, from about 2% to about 20% by weight of carbon particles having a size smaller than 3 microns and an average size not larger than about 1 micron, and from 89% to about 30% by weight of diluent particles having a size such that substantially all of them pass through a 100 mesh screen and are retained on a 325 mesh screen, such diluent particles being particles of at least one member of the group consisting of $CaF_2$, $SiO_2$ and $Al_2O_3$. All screen sizes employed herein are U. S. standard.

We have found that compositions, within the range above specified, can be successfully used as fluid beds in the production of $CCl_3F$ from gaseous $CCl_4$ by fluid bed procedures. Such compositions give high rates of conversion and of $CCl_3F$ formation until the $CaF_2$ particles of a size to pass through a 325 mesh screen are spent, a period of several hours. The high rates of conversion and of $CCl_3F$ formation can be extended almost indefinitely by gradually withdrawing spent solids from the top of the bed and simultaneously adding fresh solids to the bottom of the bed so as to maintain the composition of the bed within the desired range, i. e. by gradually replacing at least part of the bed with fresh solids. Such compositions apparently remain in a fluidized state indefinitely and do not agglomerate so as to cease to function.

Such results are due to the combined effects of the carbon and of the relatively coarse diluent particles. If the carbon is omitted or reduced materially below 2% by weight, the bed will remain fluid for a time but, as the $CaCl_2$ builds up on the surfaces of the particles, the particles will agglomerate and the bed will become a nonfluid mass which gives very slow and impractical rates of conversion and of $CCl_3F$ formation. If the $CaF_2$ particles passing through a 325 mesh screen are omitted or reduced below 9% by weight of the bed, the rates of conversion and of $CCl_3F$ formation quickly become very slow and the process becomes uneconomical and impractical. If the proportion of $CaF_2$ passing through a 325 mesh screen is increased to above 50% by weight of the bed or if the proportion of them which are smaller than 10 microns is increased to above 45% by weight, the particles soon agglomerate and it is practically impossible to maintain the bed in a fluidized state.

The $CaF_2$ is substantially pure fluorspar, preferably acid-grade spar which is a quality of fluorspar which contains a minimum of silica and about 98% $CaF_2$. The $CaF_2$, employed in the examples given hereinafter, was such an acid-grade spar.

The primary function of the diluent particles is physical, to dilute the finer $CaF_2$ particles and aid in preventing agglomeration. The $SiO_2$ and the $Al_2O_3$ are inert to the reaction and should be substantially pure. Usually, the $SiO_2$ is sand, preferably flint sand containing at least 98% of $SiO_2$ and a minimum of impurities, particularly of iron oxide and calcium and magnesium carbonates. Iron oxide tends to form $FeCl_3$ which is deleterious to the reaction mass. The alumina ($Al_2O_3$) should also be substantially pure and, preferably, is alundum. While the diluent particles may be particles of $SiO_2$ or $Al_2O_3$ or mixtures thereof solely, it is sometimes preferred that at least a material proportion of the diluent particles be particles of $CaF_2$, particularly when the finer particles of $CaF_2$ constitute less than 40% by weight of the bed and the non-transitory particles are to be removed from the reactor, treated to remove $CaCl_2$, and returned to the reactor. In the latter case, the diluent $CaF_2$ particles will be present in an amount so that the total amount of $CaF_2$ particles (fine+coarse) will constitute at least 40% by weight of the bed. While the diluent $CaF_2$ particles react slowly, particularly as the $CaCl_2$ builds up on their surfaces, and hence they function mainly as diluents to aid in preventing agglomeration, they do for a time contribute somewhat to the formation of $CCl_3F$. Also, as is pointed out in more detail hereinafter, portions of the bed are gradually withdrawn, treated to remove the $CaCl_2$, and recycled to the bed. By such treatment, the diluent $CaF_2$ particles are reduced in size and eventually form part of the finer particles. Also, if diluent particles of $SiO_2$ and $Al_2O_3$ form too large a proportion of the bed, the amount thereof, which must be handled in such treatment steps and recycled, becomes uneconomically large.

The carbon particles must have a size of less than 3 microns and an average size not larger than about 1 micron. Usually, the average size will be less than 1 micron, preferably about 0.5 micron. The maximum amount of such carbon particles is dictated by economics and practicality. Amounts, in excess of 20% by weight of the bed (up to about 60%), may be used but serve no useful purpose and reduce the economic advantages of the process, because the amount which must be recycled becomes unduly large and there is a chance of loss of carbon. Preferably, the carbon particles will be present in a proportion of from about 2% to about 5% by weight of the bed. The carbon may be of any common black type such as charcoal, gas black, lamp black and graphite.

The main product of the reaction is $CCl_3F$. However, an appreciable quantity of $CCl_2F_2$ is also formed, the amount of which will vary depending upon the temperature and the rate of reaction. Under the optimum conditions about 1 mol per cent of $CCl_2F_2$ is formed. Also, during the reaction, about 2–3 mol per cent of the $CCl_4$ normally is pyrolyzed to $C_2Cl_4$ and $C_2Cl_6$. This pyrolysis can be reduced some 40–60% by adding from about 5 mol per cent to about 20 mol per cent of chlorine ($Cl_2$) to the $CCl_4$ feed. For example, when 10 mol per cent of $Cl_2$ was added to the $CCl_4$ feed in our process, the pyrolysis by-product content of the exit gas dropped from 1.9 mol per cent of the $CCl_4$ fed to 1.1 mol per cent.

The gaseous $CCl_4$, including mixtures thereof with 5–20 mol per cent of $Cl_2$ if desired, is passed through the bed at superficial linear velocities of from 0.1 to 0.3 foot per second, preferably at about 0.2 foot per second. Below 0.1 foot per second, the bed is not in a fluidized state. A fluid bed (a bed in a fluidized state) resembles a boiling liquid and has a uniform temperature throughout. Above 0.3 foot per second, diluent particles become entrained in the gas leaving the bed and are carried out of the bed.

Within the limits hereinbefore set forth, the superficial linear velocity of the gaseous $CCl_4$ and the degree of fineness of the $CaF_2$ particles, which are of a size to pass through a 325 mesh screen, desirably will be varied in relation to each other depending upon whether it is desired to remove such particles from the top of the bed by entrainment in the exit gases. In some cases, it is desirable to retain most of such particles in the bed and to keep to a minimum the amount of such particles which are entrained in the exit gases. In such cases, the average size of such particles and the superficial linear velocity of the gases will be adjusted so that such velocity will be below the terminal settling velocity of particles of such average size. In other cases, it is desirable to remove all or most of such particles from the bed and from the reactor by entrainment in the exit gases. In such other cases, the size of such particles and the superficial linear velocity of the gases will be adjusted so that such velocity will exceed the terminal settling velocity of all or most of such particles. The terminal settling velocity of particles of various sizes can readily be determined by those skilled in the art according to well known methods or from published graphs such as that shown in Fig. 114A appearing on page 1021 of the Chemical Engineer's Handbook, 3rd edition, by J. H. Perry, published by McGraw-Hill Book Company, Inc. in 1950. $CaF_2$ has a specific gravity of 3.18, and substantially spherical particles thereof 23 microns in size have a terminal settling velocity in air of 0.17 foot per second while those 40 microns in size have a terminal settling velocity of substantially 0.3 foot per second. Particles, passing through a 325 mesh screen, have a maximum size of about 44 microns.

Our invention may be best understood from a consideration of the accompanying drawings which illustrate types of apparatus suitable for carrying out our process, of the detailed description thereof given hereinafter, and of the illustrative examples given in connection therewith. In such drawings.

Figure 3:
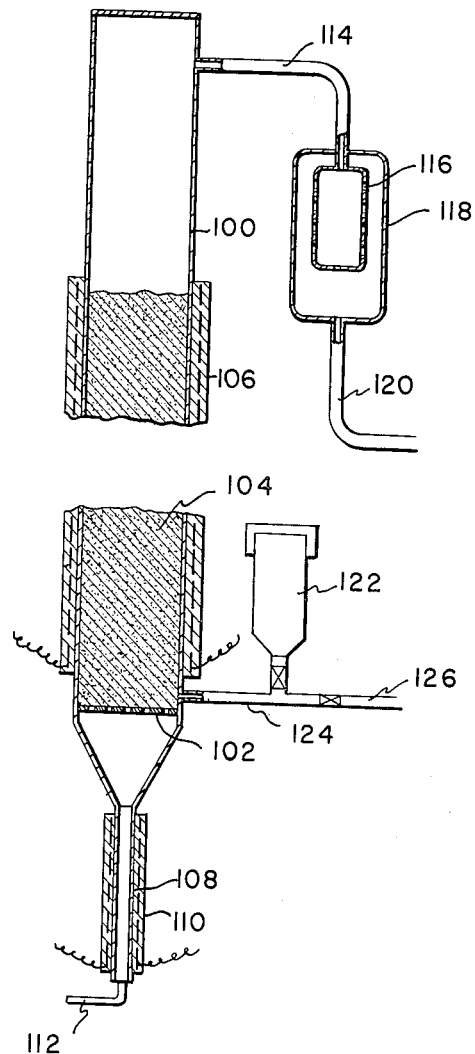
Figure 3 is a vertical sectional view of another form of reactor and part of the equipment used in connection therewith, which is suitable for carrying out our process employing a second desirable mode of operation.

Figure 4 consists of a pair of graphs illustrating the operation of the reactor of Figure 3 and the results obtained thereby, particularly as described in Example 2.

Figure 1:
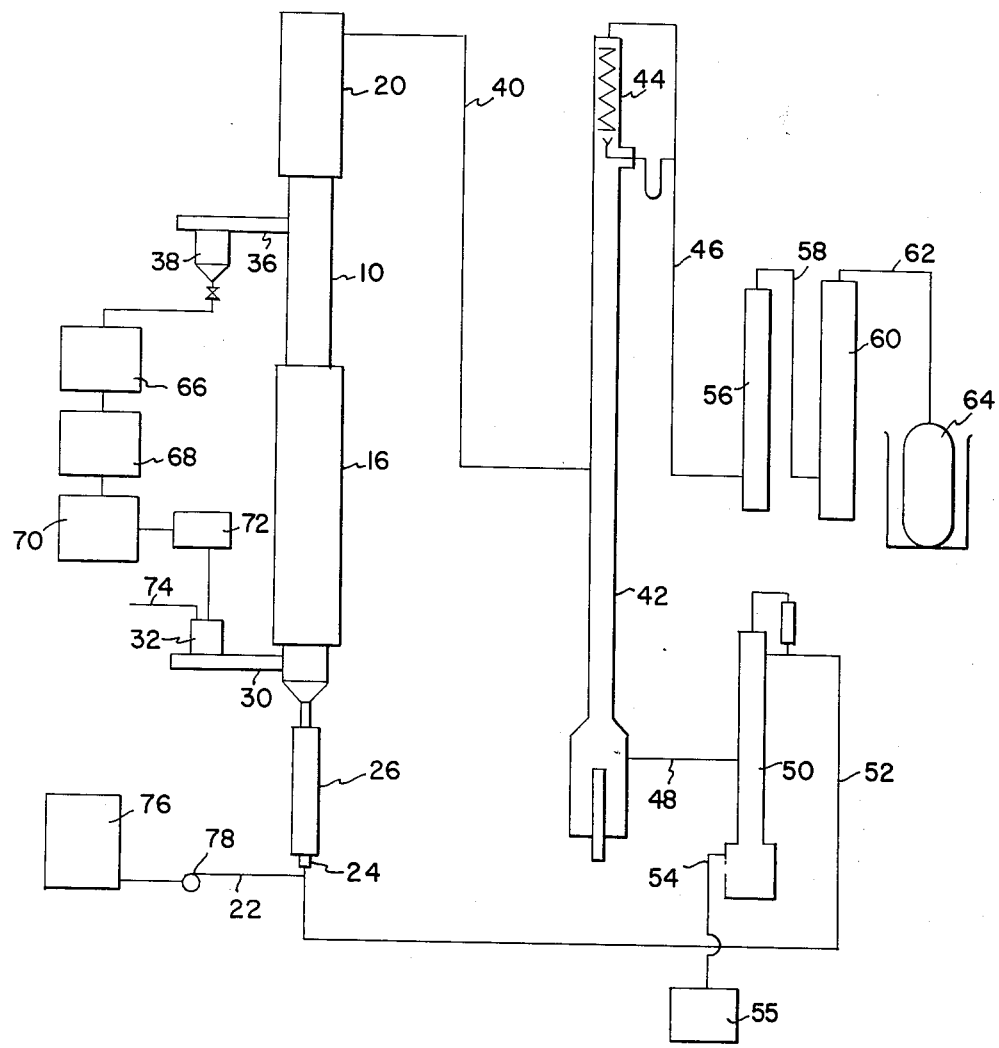
Figure 1 is a view, diagrammatic in character, of a type of apparatus suitable for carrying out our process employing one desirable mode of operation.
Figure 2:
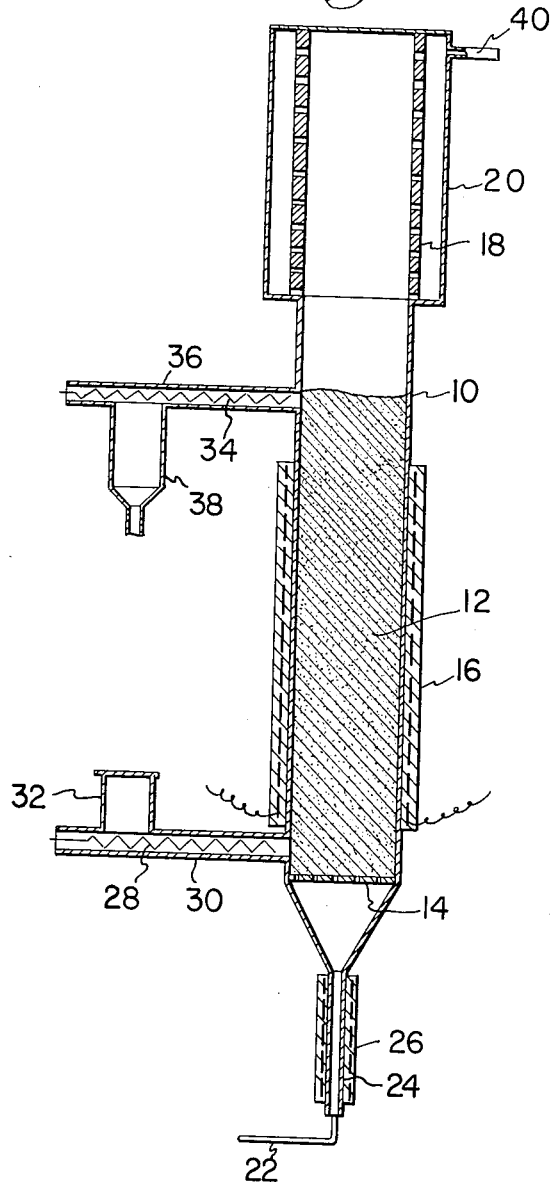
Figure 2 is a vertical sectional view of the reactor employed in the apparatus of Figure 1.

Referring first to Figures 1 and 2, the reactor 10 is an elongated tubular member constructed of a material that is resistant to both chlorine and carbon tetrachloride at the temperature of the reaction. Nickel, inconel and Pyrex glass are satisfactory. In the apparatus employed in Example 1, the reactor consists of a nickel tube 4 inches in diameter and 12 feet high in the reaction zone. The fluid bed 12 is supported on a porous carbon block or disc 14. The reaction zone is heated by a Nichrome heater 16 wound around the tube 10. The carbon tetrachloride storage tank 76 is connected through a pump 78 and line 22 to a vaporizing zone 24 which is also surrounded and heated by an electrical heater 26. At the top of the reactor, there is provided a porous stone filter 18 surrounded by an enlarged chamber 20.

Near the bottom of the reactor, there is provided a feeder 30 for feeding fresh solids into the bed. Such feeder comprises a screw conveyor 28 operated by a motor (not shown) and feeding solids from a hopper 32. The reactor is also provided with a second feeder 36 positioned slightly below the top of the fluid bed. Such feeder 36 comprises a screw conveyor 34 operated by a motor (not shown) and feeding solids from the top of the fluid bed to a hopper 38.

The upper end of the enlarged chamber 20 is connected through a conduit 40 to the middle of a distillation column 42. The distillation column is provided at its top with a condenser 44 and a $CCl_3F$ discharge line 46. The bottom of the distillation column is provided with a liquid discharge line 48 leading to a recovery column 50 provided with a $CCl_4$ discharge line 52 and a liquid discharge line 54 leading to a receiver 55. The line 52, preferably, leads to the bottom of the vaporizing zone 24. The conduit 46 leads into the lower portion of a caustic scrubber 56. The top of the scrubber is connected through a line 58 with the lower portion of a drying tower 60. The top of the tower 60 is connected by line 62 with a refrigerated receiver 64.

The hopper 38 discharges into a washer 66 which, in turn, discharges into a filter 68. The filter 68 discharges solids into the dryer 70 which is of the rotary kiln type. The dryer 70 discharges dried material to a crusher 72 which, in turn, discharges crushed material into the hopper 32. A feed line 74 also discharges into the hopper 32 and is connected with a supply (not shown) of fresh solids.

Preferably, the apparatus is placed in operation by turning on the heaters 16 and 26 and passing nitrogen through the reactor at a superficial linear velocity of about 0.3 foot per second until the fluid bed is heated to the desired reaction temperature. Then the flow of nitrogen is gradually decreased and stopped while gradually replacing it with gaseous carbon tetrachloride. Other inert gases or gaseous $CCl_4$ may be employed in place of the nitrogen, but the use of nitrogen for starting the operation is preferred for reasons of convenience and economy. Liquid $CCl_4$ is pumped from the storage tank 76 into the vaporizing zone 24 where it is heated and vaporized and passes up through the reactor and the fluid bed contained therein. During its passage through the fluid bed, the carbon tetrachloride reacts with the $CaF_2$ to produce $CCl_3F$ and some $CCl_2F_2$. The gaseous reaction mixture passes to the top of the reactor, through the porous stone filter 18 and into the enlarged collecting chamber 20. The filter 18 removes any finely-divided solids entrained by the gases and such solids fall back on to the top of the fluid bed.

The gaseous reaction mixture passes from the chamber 20 through line 40 into the distillation column 42 where it is fractionated. Carbon tetrachloride is condensed and passes from the bottom of the column 42 to the recovery column 50 where it is again fractionated to discharge pure carbon tetrachloride from the top through line 52 and liquid pyrolysis products, such as $C_2Cl_4$ and $C_2Cl_6$, from the bottom through line 54 to receiver 55.

The $CCl_3F$ and $CCl_2F_2$ are condensed in condenser 44 and pass into line 46 where they vaporize. Such vapors then pass through scrubber 56 which is charged with aqueous sodium hydroxide and then through drying tower 60 which is charged with calcium sulfate or other drying agent and finally are condensed in the refrigerated receiver 64.

When the process is to be operated continuously over long periods of time, solids are gradually removed from the top of the fluid bed and fresh solids simultaneously added at the bottom of the fluid bed. Such gradual replacement of the fluid bed usually will be performed continuously, but may be performed intermittently at spaced intervals of up to about 2 hours, the first addition of fresh solids conveniently taking place after about 7 hours of operation. The solids removed from the top of the bed contain $CaF_2$ which has been partially reacted and which is coated with calcium chloride. Such material is passed to the washer 66 where it is mixed with water which, preferably, contains a small amount of a flocculating agent for the finely-divided $CaF_2$ and the carbon. The water dissolves the calcium chloride from the particles and the mixture is then passed to the filter 68 where the solid particles are filtered out and washed with water until the wash water ceases to show a test for chloride ion. The filter cake is passed to the dryer 70 where it is dried and then to the crusher 72 which breaks up any agglomerates. The material from the crusher is discharged into the hopper 32 where it is mixed with carbon and fresh $CaF_2$ which is of such particle size and in such an amount as to replace the $CaF_2$ which has been reacted and to adjust the composition to the desired composition of the fluid bed. The resulting mixture is then ready to be fed into the bottom of the reactor at the same time that material is removed from the top of the bed and in an amount to correspond to that which is removed from the top of the bed.

In employing the apparatus of Figures 1 and 2, it is preferred that the particles of $CaF_2$, which are of a size to pass through a 325 mesh screen, constitute from about 16% to 50% by weight of the bed. It will also be preferable to have a minimum amount thereof entrained in the gases leaving the bed and contacting the filter 18. Therefore, it will be preferred to adjust the size of such particles of $CaF_2$ and the superficial linear velocity of the gases so that such velocity is below the terminal settling velocity of a considerable proportion of such particles. The size of the particles can be controlled, in part, by the fineness of grinding. However, since the size of the particles of $CaF_2$ is decreased by partial conversion to $CaCl_2$ and the removal of such $CaCl_2$ by washing, it is practically impossible to avoid having a considerable amount of particles having a size such that they are entrained by the gases.

Also, when the apparatus of Figures 1 and 2 is used, it is preferable to have $CaF_2$ particles (fine and diluent) present in an amount to constitute at least 40% by weight of the bed. When $CaF_2$ particles constitute all or a portion of the diluent particles of the bed, they are gradually reduced in size, eventually to a size which will pass through a 325 mesh screen. Accordingly, the solids added through line 74 will frequently be composed predominantly of diluent $CaF_2$ particles (particles retained on a 325 mesh screen), together with carbon to replace that lost in the washing and recycling system.

In order to more clearly illustrate such mode of operation and the preferred method for carrying it into effect, the following example is given:

*Example 1*

Into the reactor of Figures 1 and 2 is charged 18 kgs. of solids consisting of: 48% by weight of acid-grade fluorspar ground to such a size that it all passed through a 100 mesh screen and 45% of it passed through a 325 mesh screen; 48% by weight of flint sand ground to such a size that it all passed a 100 mesh screen and 56% of it passed a 200 mesh screen and 99% of it was retained by a 325 mesh screen; and 4% by weight of a furnace black ranging from about 0.2 to 1.0 micron in diameter and averaging about 0.5 micron in diameter. The heaters 16 and 26 are turned on and nitrogen is passed through the reactor 10 at a superficial linear velocity of 0.3 foot per second until the temperature of the so-formed fluid bed is 500° ± 5° C. At this time, the temperature profile of the reactor, as read by thermocouples, should be such that all readings are within 5° C. of each other, which is characteristic of fluid bed operation.

Now, during a period of about 1 hour, the flow of nitrogen is gradually decreased and stopped while simultaneously replacing the nitrogen flow with $CCl_4$ which is vaporized and heated in section 24 so as to maintain the superficial linear velocity of 0.3 foot per second in the fluid bed. After all the nitrogen flow has been replaced by $CCl_4$, the superficial linear velocity is gradually dropped, over a period of about 6–7 hours, to approximately 0.2 foot per second which is an hourly feed rate of about 4.0 kg. of $CCl_4$ The higher velocity is desirable at the start to ensure fluid bed operation and to arrive at a steady state of operation. During this time, $CCl_3F$ is formed by reaction of the $CCl_4$ with $CaF_2$, along with a minor amount of $CCl_2F_2$.

At the end of about 7 hours, approximately 22 mol per cent of the $CaF_2$ has been reacted and a corresponding amount of $CaCl_2$ has been formed which remains as a coating over the fluorspar particles. A relatively steady state of operation has been achieved and the exit gas from the reactor contains about 9.0 mol per cent $CCl_3F$ and about 0.4 mol per cent $CCl_2F_2$. About 2 mol per cent of pyrolysis products, consisting mainly of $C_2Cl_4$ and $C_2Cl_6$, are also formed. The balance of the exit gas consists of unchanged $CCl_4$.

There is now fed into the reactor fluid bed, through feeder 30, a quantity of the same fluid bed composition originally charged, and an equivalent quantity of partly reacted solids is simultaneously removed through screw feeder 36. About 1 kg. is fed in at the bottom over a period of about 15 minutes and 1 kg. removed from the top in the same period.

The 1 kg. of material removed through screw feeder 36 is slurried with 1.7 kg. of boiling water in an agitated vessel for 10 minutes to dissolve $CaCl_2$. There is then added 1.2 kg. of cold water containing 0.25 g. of sodium carboxymethylcellulose. This latter agent is added to assist in flocculating the fluorspar and the furnace black. The slurry is then filtered and washed with hot water until the wash water shows no test for chloride ion. The filter cake is dried in an oven at 130° C. To the dried mass is added 125 g. of the fluorspar of the same specification as used in the initial charge to replace the $CaF_2$ reacted and the whole is tumbled for about 1 hour to homogenize it and to disintegrate any lumps. It is then ready to be used as feed for the fluid bed through screw feeder 30.

At the completion of this step, there is achieved a steady state of operation whereby fresh fluorspar and $CCl_4$ are fed in at the bottom of the fluid bed and partially reacted fluorspar and $CCl_3F$ (containing a small amount of $CCl_2F_2$) are removed at the top of the fluid bed. The operation of adding and removing 1 kg. of the fluid bed is performed at 2 hour intervals.

At the end of 100 hours' operation, a sample of the exit gas shows 8.9 mol per cent $CCl_3F$, 0.4 mol per cent $CCl_2F_2$ and 1.05 mol per cent $C_2Cl_4$ and $C_2Cl_6$. During this 100 hour operation, 51 kg. of $CCl_3F$ and 2.2 kg. of $CCl_2F_2$ are obtained.

Referring now to Figure 3 of the drawings, the reactor 100 is an elongated tubular member which is made of a material that is resistant to the action of $CCl_4$ and chlorine at the temperatures of the reaction. In the examples given hereinafter, the reactor was a Pyrex tube 2 inches in diameter and about 4 feet long and contained a fluid bed 104 about 3 feet in height. The fluid bed 104 is supported upon a porous carbon block or disc 102. The reaction zone is heated by a Nichrome heater 106 wound around the tube. A vaporizing zone 108 is provided at the lower end of the reactor and is heated by a heater 110. The lower end of the vaporizing zone is connected to a supply pipe 112 for the $CCl_4$ from a suitable source, such as the storage tank 76 and pump 78 of Figure 1.

The upper end of the reactor is provided with an exit pipe 114 which discharges into a filter bag 116 enclosed in a chamber 118. The chamber 118 is provided with a gas discharge line 120 which is connected to a system for separating and recovering gaseous products which recovery system may desirably be similar to that shown in Figure 1 and represented by the numerals 42 to 64, inclusive, thereof. The reactor is also provided with means for introducing fresh solids adjacent the bottom of the fluid bed. Such means comprises a supply pipe 124 connected with a hopper 122 and with a gas supply line 126.

The apparatus of Figure 3 is particularly designed and adapted for operation where it is desirable to remove all or most of the more finely-divided particles of $CaF_2$ from the top of the bed and from the reactor by entrainment in the exit gases. In other words, in the use of this apparatus, all or most of the $CaF_2$ particles, which pass through a 325 mesh screen, will also be of a size such that they will be entrained by the gases passing through the reactor; such particles thus becoming a transitory phase in the bed. In order to be transitory in our process, the $CaF_2$ particles must have a size smaller than 40 microns. Particles of 40 microns or larger have a terminal settling velocity of at least 0.3 foot per second and will not be entrained by the gases. Preferably, the transitory $CaF_2$ particles will have a size less than 23 microns so that they will have a terminal settling velocity sufficiently below 0.2 foot per second that the particles will be transitory when the gaseous $CCl_4$ is passed through the reactor at the preferred superficial linear velocity of about 0.2 foot per second. At least 55% of the transitory $CaF_2$ particles must have a size at least as large as 10 microns; i. e. the transitory $CaF_2$ particles must have an average size of at least 10 microns in order to avoid agglomeration in the bed. The transitory $CaF_2$ in the bed, preferably, will be present in a proportion of from about 9.8% to about 24% by weight.

The apparatus of Figure 3 will be started and at least initially operated similarly to the apparatus of Figures 1 and 2. However, the transitory $CaF_2$ particles, together with a corresponding proportion of the carbon particles, will be carried through and out of the bed and out of the reactor by entrainment in the gaseous reaction mixture and into the filter bag 116 which removes the solid particles from the gaseous mixture and collects them while permitting the gases to pass through line 120 to the recovery system. Fresh transitory $CaF_2$ particles (of a size to be entrained by the gaseous mixture), mixed with carbon particles, will be gradually blown into the bottom of the bed from hopper 122 through pipe 124 by gaseous $CCl_4$ or an inert gas, such as nitrogen, introduced through pipe 126. Such transitory particles may be blown into the bed continuously, intermittently, or periodically as required to maintain the composition of the bed within the desired range. It has been found satisfactory to first blow in transitory particles after about 4 hours of initial operation and thereafter about every 30 minutes, each time in an amount corresponding to that which has been collected in the filter bag in the meantime. The material collected in the filter bag will be removed therefrom as required, washed, dried, and ground or tumbled to break up agglomerates. Such recovered transitory particles, consisting of $CaF_2$ and carbon, may then be mixed with fresh transitory $CaF_2$ in an amount sufficient to bring the composition back to the desired ratio of $CaF_2$ and carbon, and charged into the hopper 122 for re-introduction into the fluid bed.

In the process employed with the apparatus of Figure 3, the non-transitory phase of the bed conveniently may be composed wholly of $SiO_2$ or $Al_2O_3$ or both. However, when $CaF_2$ particles form all or a material part of the non-transitory phase of the bed (particles too large to be entrained by the gases), they will gradually become coated with a thick layer of calcium chloride and be rendered substantially inert. In such case, it sometimes will be desirable to replace the spent non-transitory $CaF_2$ particles with fresh non-transitory $CaF_2$ particles. Such replacement may be accomplished all at once or may be gradual by the means shown in connection with the apparatus of Figures 1 and 2 and in the manner hereinbefore described with respect to the operation of such apparatus.

In order to more clearly describe the mode of operation employed with the apparatus of Figure 3 and preferred methods of carrying the same into effect, the following examples are given:

*Example 2*

The apparatus of Figure 3 was used. The reactor 100 was charged with an initial bed consisting of 1825 grams of ground fluorspar all of which passed a 100 mesh screen and all retained on a 325 mesh screen, which comprised the non-transitory phase; 203 grams of transitory $CaF_2$, all of which passed through a 325 mesh screen, and in which the particles were estimated to be between 12 and 23 microns and to have an average size of about microns; and 40 grams of graphite of an average size of 1 micron. The transitory $CaF_2$ was obtained by blowing 325 mesh material with air at a superficial linear velocity of 0.17 foot per second and collecting the air transported material. 0.17 foot per second is the terminal settling velocity of 23 micron spheres in air at 75° F. as determined from Figure 114A, page 1021, Chemical Engineer's Handbook, 3rd edition, J. H. Perry.

The charge in the reaction tube was then heated by the electrical heater 106 and was fluidized by passing nitrogen into it. The temperature should not vary more than 5° C. at various points in the bed when it is properly fluidized. When the fluid bed reached 500° C., the transitory phase, which had accumulated in filter 116, was returned to hopper 122. Then the flow of nitrogen was gradually replaced by $CCl_4$. The rate of flow of $CCl_4$ was adjusted to a superficial linear velocity of .20 foot per second. Since the terminal settling velocity of the largest particles of the transitory phase is 0.17 foot per second, this velocity is sufficient to carry the transitory phase over into the filter bag. The fluid bed occupied a height of 34 inches in the reactor under these conditions.

The transitory phase was removed at a rate of 55–60 grams per hour in the filter bag 116. Fresh transitory phase was added intermittently from hopper 122 by blowing it in about once every 30 minutes in a quantity equal to that removed from the bed. It required about 1 to 2 minutes to blow in such amount of transitory phase and the amount of nitrogen so introduced was estimated to be insufficient to cause an increase in the superficial linear velocity of more than about 10% during such time. The average residence time of the transitory phase in the reactor was about 3.5 hours. The transitory phase was analyzed as it was collected to determine how much $CaF_2$ had been converted to $CaCl_2$. The results are shown in Figure 4 of the drawings. In the lower graph, the grams of transitory phase blown out or "dusted" is plotted on a cumulative basis against time. The average dusting rate was 56.5 g. per hour. In the upper graph, the per cent of fluorspar conversion is plotted against time. It will be observed that the per cent conversion rises rapidly at first and then levels off at about 29–30% after about 6–7 hours as equilibrium in the fluid bed is reached. Based on the $CCl_4$ feed of 1809.5 g. per hour this corresponds to a 13.4% conversion to $CCl_3F$.

The process was continued for 4 hours after equilibrium was reached. During this time an average of 56.5 g. per hour (0.725 mole per hour) of fresh transitory phase was fed and 1809.5 g. per hour (11.75 moles per hour) of $CCl_4$ was passed in, or a total of 7238 g. (47 moles) of $CCl_4$. The yield was 865 g. (6.29 moles) of $CCl_3F$.

*Example 3*

The apparatus of Figure 3 was used and it was charged with non-transitory phase and transitory phase in the proportion of 74:25, each phase being the same in composition as in Example 2. The total charge weighed 2226 g.

The bed was fluidized, heated and changed to $CCl_4$ feed as before.

In this experiment, instead of feeding only fresh transitory phase, recovered transitory phase was used with added fresh transitory phase to replace that used up. It had been washed with hot water to remove the calcium chloride, dried, and crushed to break up agglomerates. The particles size of the recovered material was, of course, smaller and the average size became constant after a short period of operation. The fresh transitory phase added thereto was of such larger size and in such amount as to maintain the composition within the limits required for continued operation. The "dusting" rate was 96 g. per hour. An equivalent amount was fed in through hopper 122. The fluorspar conversion levelled off at 44–45% after 6–7 hours.

The experiment was continued for 3 hours after equilibrium was reached. The feed of $CCl_4$ was 1768 g. per hour (11.48 moles per hour) and the transitory phase fed in was 96 g. per hour (1.23 moles per hour). During this time, 496 g. (3.60 moles) of $CCl_3F$ was obtained and 4460 g. (28.96 moles) of $CCl_4$ was recovered.

It will be understood that the apparatus, shown in the drawings and described in detail in the specification, and the examples are given for illustrative purposes solely and that our invention is not limited to the specific embodiments disclosed therein or the particular types of apparatus specifically shown. It will be readily apparent to those skilled in the art that the apparatus may be widely varied and may be of other types adapted for carrying out fluid bed procedures, without departing from the spirit or scope of our invention. Likewise, the composition of the fluid beds, the superficial linear velocities and the other conditions may be varied within the limits hereinbefore set forth in the general description.

From the preceding description of our invention, it will be apparent that we have provided a new and improved method for reacting $CCl_4$ with $CaF_2$ to produce $CCl_3F$, whereby fluid bed procedures, particularly in a continuous manner, may be carried out successfully and practicably. The process is simple, economical and easily carried out. Good yields of $CCl_3F$ are obtained based on the consumption of both $CaF_2$ and $CCl_4$. Therefore, it is apparent that our invention constitutes a valuable advance in and contribution to the art.

We claim:

1. A composition, adapted for use as a fluid bed in the vapor phase reaction of $CCl_4$ with $CaF_2$ to form $CCl_3F$, which is an intimate mixture of discrete solid particles consisting essentially of between 9% and 50% by weight of $CaF_2$ particles having a size such that they all pass through a 325 mesh screen but at least 55% of them are at least as large as 10 microns, from about 2% to about 20% by weight of carbon particles having a size smaller than 3 microns and an average size not larger than about 1 micron, and from 89% to about 30% by weight of diluent particles having a size such that substantially all of them pass through a 100 mesh screen and are retained on a 325 mesh screen, such diluent particles being particles of at least one member of the group consisting of $CaF_2$, $SiO_2$ and $Al_2O_3$.

2. A composition, adapted for use as a fluid bed in the vapor phase reaction of $CCl_4$ with $CaF_2$ to form $CCl_3F$, which is an intimate mixture of discrete solid particles consisting essentially of from about 16% to 50% by weight of $CaF_2$ particles having a size such that they all pass through a 325 mesh screen but at least 55% of them are at least as large as 10 microns, from about 2% to about 20% by weight of carbon particles having a size smaller than 3 microns and an average size not larger than about 1 micron, and from about 82% to about 30% by weight of diluent particles having a size such that substantially all of them pass through a 100 mesh screen and are retained on a 325 mesh screen, such diluent particles being particles of at least one member of the group consisting of $CaF_2$, $SiO_2$ and $Al_2O_3$.

3. A composition, adapted for use as a fluid bed in the vapor phase reaction of $CCl_4$ with $CaF_2$ to form $CCl_3F$, which is an intimate mixture of discrete solid particles consisting essentially of from about 16% to 50% by weight of $CaF_2$ particles having a size such that they all pass through a 325 mesh screen but at least 55% of them are at least as large as 10 microns, from about 2% to about 5% by weight of carbon particles having a size smaller than 3 microns and an average size not larger than about 1 micron, and from about 82% to about 45% be weight of diluent particles having a size such that substantially all of them pass through a 100 mesh screen and are retained on a 325 mesh screen, such diluent particles being particles of at least one member of the group consisting of $CaF_2$, $SiO_2$ and $Al_2O_3$.

4. A composition, adapted for use as a fluid bed in the vapor phase reaction of $CCl_4$ with $CaF_2$ to form $CCl_3F$, which is an intimate mixture of discrete solid particles consisting essentially of about 22% by weight of $CaF_2$ particles having a size such that they all pass through a 325 mesh screen but at least 55% of them are at least as large as 10 microns, about 4% by weight of carbon particles having a size smaller than 3 microns and an average size of about 0.5 micron, about 26% by weight of $CaF_2$ particles having a size such that substantially all of them pass through a 100 mesh screen and are retained on a 325 mesh screen, and about 48% by weight of $SiO_2$ particles having a size such that substantially all of them pass through a 100 mesh screen and are retained on a 325 mesh screen.

5. A composition, adapted for use as a fluid bed in the vapor phase reaction of $CCl_4$ with $CaF_2$ to form $CCl_3F$, which is an intimate mixture of discrete solid particles consisting essentially of between 9% and 50% by weight of transitory $CaF_2$ particles having a size smaller than 40 microns but at least 55% of which are at least as large as 10 microns, from about 2% to about 20% by weight of carbon particles having a size smaller than 3 microns and an average size not larger than about 1 micron, and from 89% to about 30% by weight of diluent particles having a size such that substantially all of them pass through a 100 mesh screen and are retained on a 325 mesh screen, such diluent particles being particles of at least one member of the group consisting of $CaF_2$, $SiO_2$ and $Al_2O_3$.

6. A composition, adapted for use as a fluid bed in the vapor phase reaction of $CCl_4$ with $CaF_2$ to form $CCl_3F$, which is an intimate mixture of discrete solid particles consisting essentially of between 9% and 50% by weight of transitory $CaF_2$ particles having a size smaller than 40 microns but at least 55% of which are at least as large as 10 microns, from about 2% to about 5% by weight of carbon particles having a size smaller than 3 microns and an average size not larger than about 1 micron, and from 89% to about 45% by weight of diluent particles having a size such that substantially all of them pass through a 100 mesh screen and are retained on a 325 mesh screen, such diluent particles being particles of at least one member of the group consisting of $CaF_2$, $SiO_2$ and $Al_2O_3$.

7. A composition, adapted for use as a fluid bed in the vapor phase reaction of $CCl_4$ with $CaF_2$ to form $CCl_3F$, which is an intimate mixture of discrete solid particles consisting essentially of from about 9.8% to about 24% by weight of transitory $CaF_2$ particles having a size smaller than 40 microns but at least 55% of which are at least as large as 10 microns, from about 2% to about 5% by weight of carbon particles having a size smaller than 3 microns and an average size not larger than about 1 micron, and from about 88% to about 71% by weight of diluent particles having a size such that substantially all of them pass through a 100 mesh screen and are retained on a 325 mesh screen, such diluent particles being particles of at least one member of the group consisting of $CaF_2$, $SiO_2$ and $Al_2O_3$.

8. The process for producing $CCl_3F$ from $CCl_4$ which comprises passing gaseous $CCl_4$ at a superficial linear velocity of from 0.1 to 0.3 foot per second upward through a fluid bed maintained at a temperature of from about 450° C. to about 550° C. and recovering $CCl_3F$ from the gaseous reaction products, said fluid bed being an intimate mixture of discrete solid particles consisting essentially of between 9% and 50% by weight of $CaF_2$ particles having a size such that they all pass through a 325 mesh screen but at least 55% of them are at least as large as 10 microns, from about 2% to about 20% by weight of carbon particles having a size smaller than 3 microns and an average size not larger than about 1 micron, and from 89% to about 30% by weight of diluent particles having a size such that substantially all of them pass through a 100 mesh screen and are retained on a 325 mesh screen, such diluent particles being particles of at least one member of the group consisting of $CaF_2$, $SiO_2$ and $Al_2O_3$.

9. The process for producing $CCl_3F$ from $CCl_4$ which comprises passing gaseous $CCl_4$ at a superficial linear velocity of from 0.1 to 0.3 foot per second upward through a fluid bed maintained at a temperature of from about 450° C. to about 550° C. and recovering $CCl_3F$ from the gaseous reaction products, said fluid bed being an intimate mixture of discrete solid particles consisting essentially of between 9% and 50% by weight of $CaF_2$ particles having a size such that they all pass through a 325 mesh screen but at least 55% of them are at least as large as 10 microns, from about 2% to about 20% by weight of carbon particles having a size smaller than 3 microns and an average size not larger than about 1 micron, and from 89% to about 30% by weight of diluent particles having a size such that substantially all of them pass through a 100 mesh screen and are retained on a 325 mesh screen, such diluent particles being particles of at least one member of the group consisting of $CaF_2$, $SiO_2$ and $Al_2O_3$, and simultaneously removing a portion of the reacted solids from the top of the bed and adding a substantially equal portion of unreacted solids to the bottom of the bed as required to maintain the composition of the bed within the range specified above.

10. The process for producing $CCl_3F$ from $CCl_4$ which comprises passing gaseous $CCl_4$ at a superficial linear velocity of from 0.1 to 0.3 foot per second upward through a fluid bed maintained at a temperature of from about 450° C. to about 550° C. and recovering $CCl_3F$ from the gaseous reaction products, said fluid bed being an intimate mixture of discrete solid particles consisting essentially of from about 16% to 50% by weight of $CaF_2$ particles having a size such that they all pass through a 325 mesh screen but at least 55% of them are at least as large as 10 microns, from about 2% to about 5% by weight of carbon particles having a size smaller than 3 microns and an average size not larger than about 1 micron, and from about 82% to about 45% by weight of diluent particles having a size such than substantially all of them pass through a 100 mesh screen and are retained on a 325 mesh screen, such diluent particles being particles of at least one member of the group consisting of $CaF_2$, $SiO_2$ and $Al_2O_3$.

11. The process for producing $CCl_3F$ from $CCl_4$ which comprises passing gaseous $CCl_4$ at a superficial linear velocity of from 0.1 to 0.3 foot per second upward through a fluid bed maintained at a temperature of from about 450° C. to about 550° C. and recovering $CCl_3F$ from the gaseous reaction products, said fluid bed being an intimate mixture of discrete solid particles consisting essentially of from about 16% to 50% by weight of $CaF_2$ particles having a size such that they all pass through a 325 mesh screen but at least 55% of them are at least as large as 10 microns, from about 2% to about 5% by weight of carbon particles having a size smaller than 3 microns and an average size not larger than about 1 micron, and from about 82% to about 45% by weight of diluent particles having a size such that substantially all of them pass through a 100 mesh screen and are retained on a 325 mesh screen, such diluent particles being particles of at least one member of the group consisting of $CaF_2$, $SiO_2$ and $Al_2O_3$, and simultaneously removing a portion of the reacted solids from the top of the bed and adding a substantially equal portion of unreacted solids to the bottom of the bed as required to maintain the composition of the bed within the range specified above.

12. The process for producing $CCl_3F$ from $CCl_4$ which comprises passing gaseous $CCl_4$ at a superficial linear velocity of from 0.1 to 0.3 foot per second upward through a fluid bed maintained at a temperature of from about 450° C. to 550° C. and recovering $CCl_3F$ from the gaseous reaction products, said fluid bed being an intimate mixture of discrete solid particles consisting essentially of between 9% and 50% by weight of transitory CaF$_2$ particles having a size smaller than 40 microns but at least 55% of which are at least as larger as 10 microns, from about 2% to about 20% by weight of carbon particles having a size smaller than 3 microns and an average size not larger than about 1 micron, and from 89% to about 30% by weight of diluent particles having a size such that substantially all of them pass through a 100 mesh screen and are retained on a 325 mesh screen, such diluent particles being particles of at least one member of the group consisting of CaF$_2$, SiO$_2$ and Al$_2$O$_3$.

13. The process for producing CCl$_3$F from CCl$_4$ which comprises passing gaseous CCl$_4$ at a superficial linear velocity of from 0.1 to 0.3 foot per second upward through a fluid bed maintained at a temperature of from about 450° C. to about 550° C. and recovering CCl$_3$F from the gaseous reaction products, said fluid bed being an intimate mixture of discrete solid particles consisting essentially of between 9% and 50% by weight of transitory CaF$_2$ particles having a size smaller than 40 microns but at least 55% of which are at least as large as 10 microns, from about 2% to about 20% by weight of carbon particles having a size smaller than 3 microns and an average size not larger than about 1 micron, and from 89% to about 30% by weight of diluent particles having a size such that substantially all of them pass through a 100 mesh screen and are retained on a 325 mesh screen, such diluent particles being particles of at least one member of the group consisting of CaF$_2$, SiO$_2$ and Al$_2$O$_3$, withdrawing reacted transitory CaF$_2$ particles from the top of the bed entrained in the gaseous reaction products, and introducing unreacted transitory CaF$_2$ particles into the bottom of the bed as required to maintain the proportion of transitory CaF$_2$ particles in the bed within the range specified above.

14. The process for producing CCl$_3$F from CCl$_4$ which comprises gassing gaseous CCl$_4$ at a superficial linear velocity of from 0.1 to 0.3 foot per second upward through a fluid bed maintained at a temperature of from about 450° C. to about 550° C. and recovering CCl$_3$F from the gaseous reaction products, said fluid bed being an intimate mixture of discrete solid particles consisting essentially of from about 9.8% to about 24% by weight of transitory CaF$_2$ particles having a size smaller than 40 microns but at least 55% of which are at least as large as 10 microns, from about 2% to about 5% by weight of carbon particles having a size smaller than 3 microns and an average size not larger than about 1 micron, and from about 88% to about 71% by weight of diluent particles having a size such that substantially all of them pass through a 100 mesh screen and are retained on a 325 mesh screen, such diluent particles being particles of at least one member of the group consisting of CaF$_2$, SiO$_2$, and Al$_2$O$_3$.

15. The process for producing CCl$_3$F from CCl$_4$ which comprises passing gaseous CCl$_4$ at a superficial linear velocity of from 0.1 to 0.3 foot per second upward through a fluid bed maintained at a temperature of from about 450° C. to about 550° C. and recovering CCl$_3$F from the gaseous reaction products, said fluid bed being an intimate mixture of discrete solid particles consisting essentially of from about 9.8% to about 24% by weight of transitory CaF$_2$ particles having a size smaller than 40 microns but at least 55% of which are at least as large as 10 microns, from about 2% to about 5% by weight of carbon particles having a size smaller than 3 microns and an average size not larger than about 1 micron, and from about 88% to about 71% by weight of diluent particles having a size such that substantially all of them pass through a 100 mesh screen and are retained on a 325 mesh screen, such diluent particles being particles of at least one member of the group consisting of CaF$_2$, SiO$_2$ and Al$_2$O$_3$, withdrawing reacted transitory CaF$_2$ particles from the top of the bed entrained in the gaseous reaction products, and introducing unreacted transitory CaF$_2$ particles into the bottom of the bed as required to maintain the proportion of transitory CaF$_2$ particles in the bed within the range specified above.

References Cited in the file of this patent

UNITED STATES PATENTS

| | | |
|---|---|---|
| 1,914,135 | Lacy | June 13, 1933 |
| 1,948,408 | Watts et al. | Feb. 20, 1934 |
| 2,110,369 | Leicester | Mar. 8, 1938 |
| 2,406,081 | LaLande et al. | Aug. 20, 1946 |
| 2,423,850 | Peery | July 15, 1947 |
| 2,487,978 | Murray | Nov. 15, 1949 |
| 2,546,930 | Passino | Mar. 27, 1951 |